US006215325B1

(12) United States Patent
Southard

(10) Patent No.: US 6,215,325 B1
(45) Date of Patent: Apr. 10, 2001

(54) IMPLEMENTING A PRIORITY FUNCTION USING RIPPLE CHAIN LOGIC

(75) Inventor: Jay Roger Southard, Fremont, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 09/280,419

(22) Filed: Mar. 29, 1999

(51) Int. Cl.[7] .................................................. H03K 19/173

(52) U.S. Cl. .............................................. 326/38; 326/105

(58) Field of Search ............................... 326/37, 38, 105; 327/407, 408

(56) References Cited

U.S. PATENT DOCUMENTS

| | | | |
|---|---|---|---|
| 4,168,530 | 9/1979 | Gajski et al. | 364/760 |
| 4,556,948 | 12/1985 | Mercy | 364/757 |
| 4,575,812 | 3/1986 | Kloker et al. | 364/760 |
| 4,748,583 | 5/1988 | Noll | 364/758 |
| 4,752,905 | 6/1988 | Nakagawa et al. | 364/760 |
| 4,831,577 | 5/1989 | Wei et al. | 364/757 |
| 4,843,585 | 6/1989 | Williams | 364/759 |
| 4,849,920 | 7/1989 | Simpson et al. | 364/615.1 |
| 4,887,084 | 12/1989 | Yamaguchi | 341/160 |
| 5,010,510 | 4/1991 | Nishimura et al. | 364/758 |
| 5,072,419 | 12/1991 | Zyner | 364/757 |
| 5,243,348 | 9/1993 | Jackson | 341/64 |
| 5,265,258 | 11/1993 | Fiene et al. | 395/725 |
| 5,404,323 | 4/1995 | Xu et al. | 364/757 |
| 5,463,562 | 10/1995 | Theobald | 364/489 |
| 5,465,335 | 11/1995 | Anderson | 395/375 |
| 5,467,462 | 11/1995 | Toshiaki | 364/578 |
| 5,497,845 | 3/1996 | Ferguson et al. | 395/600 |
| 5,504,915 | 4/1996 | Rarick | 395/800 |
| 5,521,837 | 5/1996 | Frankle et al. | 364/491 |
| 5,560,007 | 9/1996 | Thai | 395/600 |
| 5,581,756 | 12/1996 | Nakabayashi | 395/602 |
| 5,634,056 | 5/1997 | Casotto | 395/619 |
| 5,764,953 | 6/1998 | Collins et al. | 395/500 |

OTHER PUBLICATIONS

Prasad, et al., "Using Parallel Data Structures in Optimistic Discrete Event Simulation of Varying Granularity on Shared–Memory Computers", 1995, IEEE, pp. 365–374.

*Primary Examiner*—Michael Tokar
*Assistant Examiner*—Don Phu Le
(74) *Attorney, Agent, or Firm*—D'Alessandro & Ritchie

(57) ABSTRACT

A ripple-data function unit having a ripple function and a data function for use in a priority circuit is described. The ripple-data function unit may be used to implement a priority encoder or a priority to 1-HOT recoder simply by defining the ripple and data functions as Boolean functions representing the ripple and arithmetic characteristics of the priority circuit desired. For example, at least one instance of a ripple-data function unit may be used to define a priority encoder if each instance includes ripple and data functions equivalent to the ripple and arithmetic characteristics of the priority encoder. Similarly, at least one instance of ripple-data function unit may be used to define a priority to-1-HOT recoder if each instance includes ripple and data functions equivalent to the ripple and arithmetic characteristics of the priority to 1-HOT recoder. The ripple-data function units may be implemented using ripple chain logic elements commonly available in many programmable logic array technologies, such as in an FPGA or an equivalent programmable logic device, improving the density of the resulting implementation.

51 Claims, 12 Drawing Sheets

270

```
Produce Column 0
        instantiate instance [0,0] and couple its first data input to A[3],          # 272
        its second data input to A[2], and its carry–in input coupled to A[1];
        for (j[1...(2^(n–1)–2)])        {
                instantiate instance [0,j] and couple its first data input to
                A[2*j+3], its second data input to A[2*j+2], and its carry–in
                input to the carry–out output of instance [0j–1];        }
        couple carry–out output of instance [0,2^(n–1)–2] to E[0];
Produce Subsequent Columns Except the Last Column
        for (k[1...n–2])    {                                                        # 274
                instantiate an instance [k,0] and couple its first data input to
                the data output of instance [k–1,2], its second data input to the
                data output of instance [k–1,1], its carry–in input to the data
                output of instance [k–1,0]; and
        for (j[1...(2^(n–1+k)–2)])    {
                instantiate an instance [k,j] and couple its first data input to the
                data output of instance [k–1,2*j+2], its second data input to the
                data output of instance  [k–1,2*j+1], its carry–in input to the data
                output of instance [k,j–1]  }
        couple the carry–out output of instance [k,2^(n–1+k)–2] to E[k];
And couple E[n–1] to data output of instance [n–1,0].                                # 276
```

*FIG. 8*

IMPLEMENTING A PRIORITY FUNCTION USING RIPPLE CHAIN LOGIC

BACKGROUND OF THE INVENTION

1. Field Of the Invention

The present invention relates to a priority function. More particularly, the present invention relates to a method and apparatus for implementing priority functions using ripple chain logic elements commonly found in programmable gate arrays.

2. The Background

A Field Programmable Gate Array, commonly referred to as an FPGA, is a well-known target technology for implementing digital circuit designs. An FPGA typically employs a mix of simple and complex structures or elements, including discrete logic gates, look-up tables, and arithmetic functions, which may be selectively connected to create a semi-custom implementation of a circuit design. To minimize implementation costs, many designers create their designs by associating a desired function with a specific structure. They may also optimize the design by using discrete logic components to reduce the number of specific structures required, obtaining a dense FPGA implementation if the group being optimized is very active, i.e., has few constants. If the design is not very active, optimization may be possible but may be constrained by the granularity of the structures offered by selected target technology. Hence, the design may only be optimized to the extent that the resulting optimized design may still be implemented using the structures provided by the target technology. If so, the implementation can be said to under-utilize the functionality offered by the structures in a selected FPGA, and is therefore larger and slower than other implementations.

One example of a circuit design feature that may be implemented using FPGA technology is a priority function. A priority function is used to select a signal from among a set of eligible signals, such as interrupt signals, according to a given priority scheme. One type of priority function, commonly known as a priority encoder, generates a binary coded output representing the position of the highest priority input signal among a set of active input signals. Another type of priority function, which is referred to as a priority to 1-hot recoder, generates an output equivalent to the position of the highest priority input signal among a set of active input signals.

Those of ordinary skill in the art will readily recognize that these priority functions may be used with a selector to select data received from more than one device. This enables data sent by more than one of the devices to be directed over a single channel or bus, which is connected to the output of the selector, in a sequential manner. Thus, a single data channel or bus may be used to transfer data from more than one device by coupling the output of a priority function to the selector inputs of the selector.

For example, FIG. 1 is a block diagram of a priority encoder 10 coupled to an encoded selector 12 (sometimes referred to as an encoded multiplexer). Priority encoder 10 has N inputs 14-1 through 14-N and n outputs 18-1 through 18-n, where $N=2^n-1$. Encoded selector 12 has N inputs 20-1 through 20-N and n selector inputs 22-1 through 22-n. The selector inputs 22-1 through 22-n are coupled to set of n outputs 18-1 through 18-n, respectively. Output 24 and inputs 20-1 through 20-N are each x bits wide. Since priority encoder 10 has N inputs, it is capable of receiving N control signals from N different devices, such as devices 26-1 through 26N.

Priority encoder 10 maps its inputs to a binary address. This enables priority encoder 10 to generate a binary coded output corresponding to an input that is receiving an active control signal from a device and which has the highest priority among a set of inputs that are receiving an active control signal. Thus, if more than one device asserts a control signal, priority encoder 10 generates a binary address that corresponds to the device that asserted one of the control signals and which has the highest priority among all active devices. Encoded selector 12 uses the address to select one of its inputs, which corresponds to the data lines of the device selected by priority encoder 10. Thus, data from N different devices may be selected using the priority encoder and encoded selector circuit disclosed in FIG. 1.

FIG. 2 is a block diagram illustrating a priority to 1-Hot recoder 30 (hereinafter referred to as a "recoder") coupled to an unencoded selector 32 (sometimes referred to as an unencoded multiplexer). Recoder 30 has inputs 34-1 through 34-N and outputs 36-1 through 36-N. Unencoded selector 32 has inputs 38-1 through 38-N; selector inputs 40-1 through 40-N coupled to outputs 36-1 through 36-N, respectively; and an output 42. Output 42 and inputs 38-1 through 38-N are each x bits wide. Since recoder 30 has N inputs, it is capable of receiving N control signals from N different devices, such as devices 46-1 through 46-N.

It is commonly known to implement priority functions and selectors using look-up tables offered by an FPGA. However, such an approach may suffer from the density limitations discussed above. In addition, such an approach does not fully utilize other components typically offered in an FPGA, such as arithmetic functions, increasing the number of look-up tables that would have been otherwise reduced if other components were used. For example, the number of look-up tables required for implementing the circuit in FIG. 1 requires $2^{(n+1)}$-n-1+$(2^n-1)\times$ look-up tables, while the circuit in FIG. 2 requires $2^{(n+1)}+\frac{1}{3}(2^n-1)$ x look-up tables.

Accordingly, a need exists for increasing the density of FPGA implementations of digital circuit designs that have priority functions and selectors.

SUMMARY OF THE INVENTION

A method and apparatus pertaining to a ripple-data function unit having a ripple function and a data function for use in a priority circuit is described. The ripple-data function unit may be used to implement a priority encoder or a priority to 1-HOT recoder simply by defining the ripple and data functions as Boolean functions representing the ripple and arithmetic characteristics of the priority circuit desired. For example, at least one instance of a ripple-data function unit may be used to define a priority encoder if each instance includes ripple and data functions equivalent to the ripple and arithmetic characteristics of the priority encoder. Similarly, at least one instance of ripple-data function unit may be used to define a priority to-1-HOT recoder if each instance includes ripple and data functions equivalent to the ripple and arithmetic characteristics of the priority to 1-HOT recoder. The ripple-data function units may be implemented using ripple chain logic elements commonly available in many programmable logic array technologies, such as in an FPGA or an equivalent programmable logic device, improving the density of the resulting implementation.

BRIEF DESCRIPTION OF THE DRAWINGS

FIG. 8 illustrates a pseudocode listing 270 representing a method for implementing an N to n priority encoder using $2^n$-n−1 instances of ripple-data function unit 116 in accordance with a presently preferred embodiment of the present invention.

DETAILED DESCRIPTION OF A PREFERRED EMBODIMENT

In the following description, a preferred embodiment of the invention is described with regard to preferred apparatus and process steps. Those skilled in the art would recognize after perusal of this application that embodiments of the invention can be implemented using circuitry in a programmable logic array, such as an FPGA or equivalent device that may be adapted to the particular process steps and/or embodiments disclosed, and that implementation of the embodiments and process steps described herein would not require undue experimentation or further invention.

Figure 1:
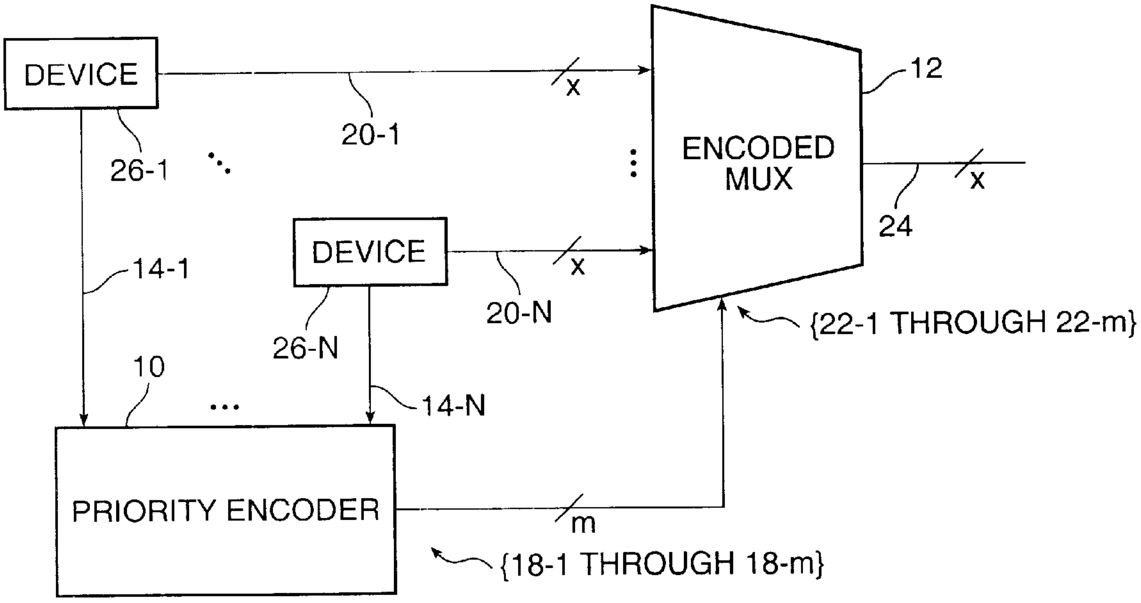
FIG. 1 is a block diagram showing a selection circuit having a priority encoder coupled to an encoded multiplexer.
Figure 2:
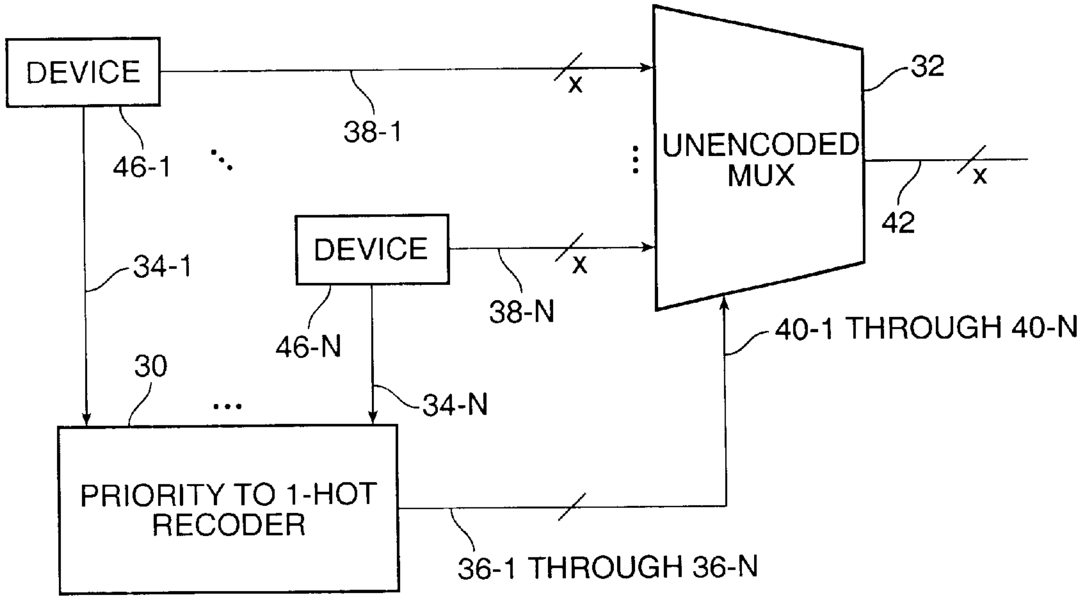
FIG. 2 is a block diagram showing a selection circuit having a priority to 1-HOT recoder coupled to an unencoded multiplexer.
Figure 3:
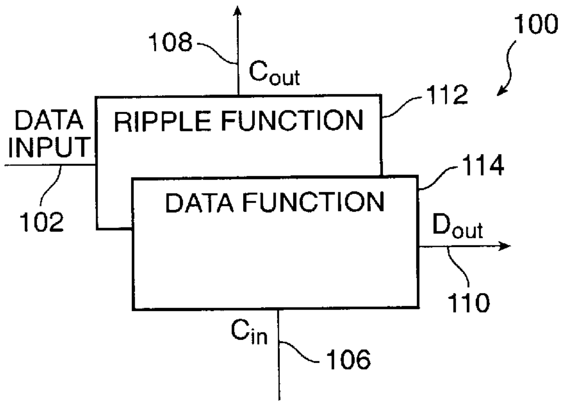
FIG. 3 is a block diagram illustrating a generic ripple-data function unit for implementing a priority circuit in accordance with a presently preferred embodiment of the present invention.

FIG. 3 is a block diagram illustrating a ripple-data function unit 100 for implementing a priority circuit, such as priority encoder or priority to 1-HOT recoder, in accordance with a presently preferred embodiment of the present invention. Ripple-data function unit 100 includes a ripple function 112 and a data function 114. The two functions rely on at least one data input 102 and a carry-in input 106 when generating a carry-out output 108 and/or a data-out output 110. Ripple function 112 may be any Boolean function suitable for accurately generalizing the requisite ripple characteristic of a particular priority circuit. Similarly, data function 114 may be any Boolean function suitable for accurately generalizing the arithmetic characteristic of a particular priority circuit.

Figure 4:
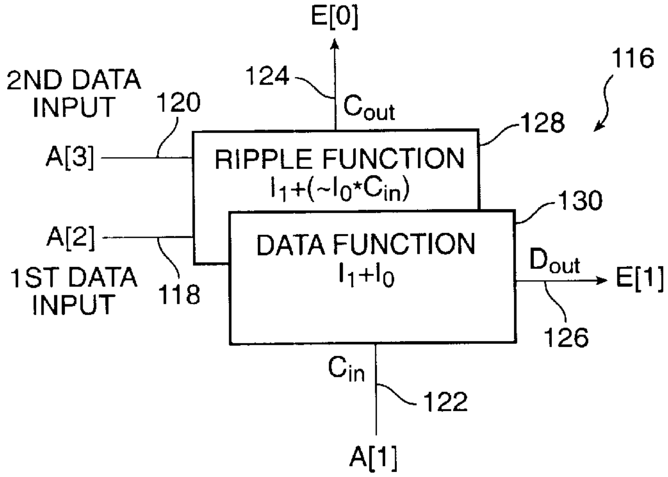
FIG. 4 is a block diagram illustrating a ripple-data function unit configured for use in the implementation of an (N to n) priority encoder in accordance with a presently preferred embodiment of the present invention.

FIG. 4 illustrates ripple-data function unit 116 configured for implementing a ($2^n$−1) to n, (hereinafter "N to n", where N=$2^n$−1) priority encoder in accordance with a presently preferred embodiment of the present invention. Ripple-data function unit 116 includes a first data input 118, a second data input 120, carry-in input 122, a carry-out output 124, and a data-out output 126. In addition, ripple-data function unit 116 includes a ripple function 128 and a data function 130. Ripple function 128 is defined by the following Boolean expression: carry-out output=first data input+(second data input * carry-in input). Data function 130 is defined by the following Boolean expression: data-out output=first data input+second data input.

An N to n priority encoder having inputs A[N:1] and outputs E[n:0] may be expressed according to the following equation:

$$E[n] = \sum_{i=(N+1)/2,}^{N} A[i]$$

In accordance with a presently preferred embodiment of the present invention, an N to n priority encoder may then be generalized using at least one ripple-data function unit 116, where the number of ripple-data function units used is equal to:

$$\sum_{i=0}^{n} (2i-1) = 2^n - n - 1$$

Thus, an N to n priority encoder may be constructed using ($2^n$-n−1) instances of ripple-data function unit 116.

Figure 5:
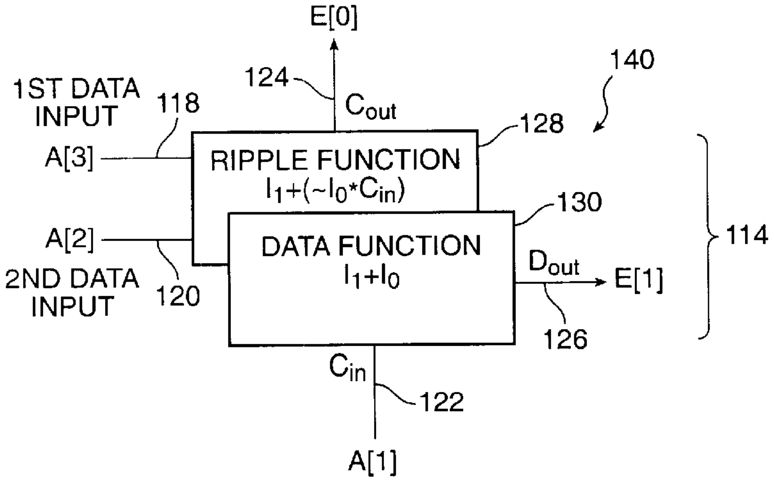
FIG. 5 is a block diagram illustrating a 3-2 priority encoder constructed using a ripple-data function unit in accordance with a presently preferred embodiment of the present invention.
Figure 6:
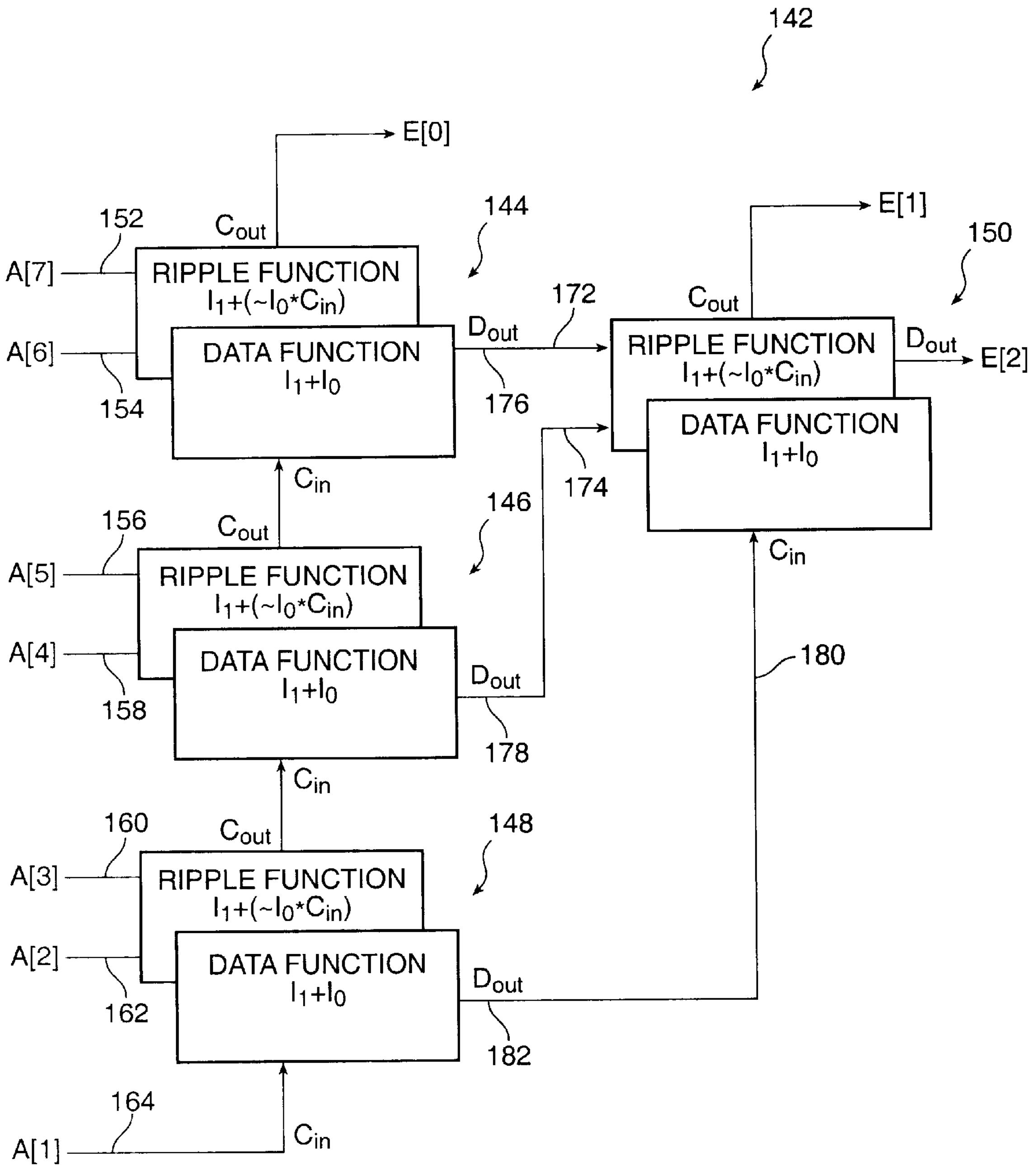
FIG. 6 is a block diagram illustrating 7-3 priority encoder constructed using multiple instances of ripple-data function units in accordance with a presently preferred embodiment of the present invention.
Figure 7A:
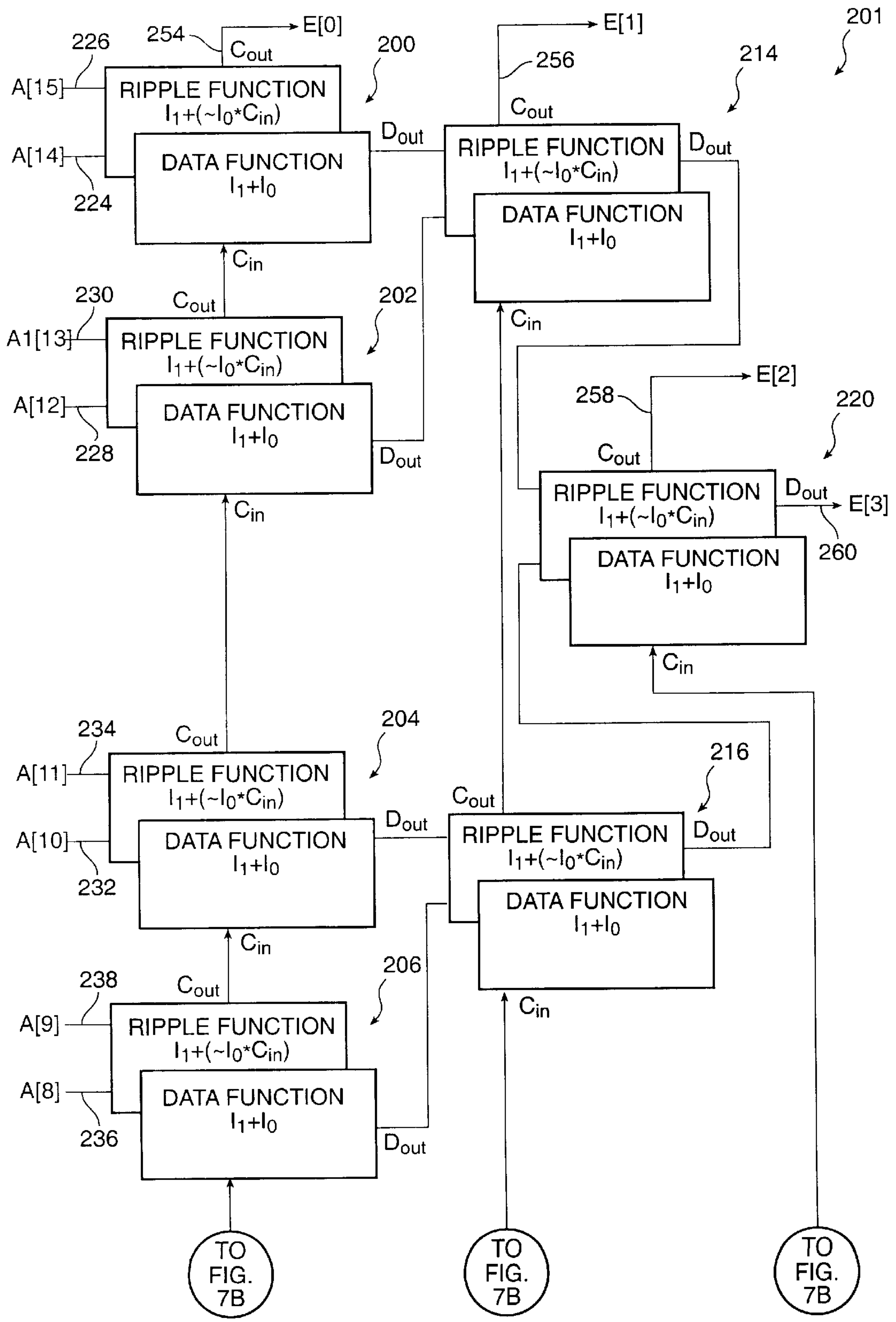
FIG. 7 is a block diagram illustrating 15-4 priority encoder constructed using multiple instances of ripple-data function units in accordance with a presently preferred embodiment of the present invention.
Figure 7B:
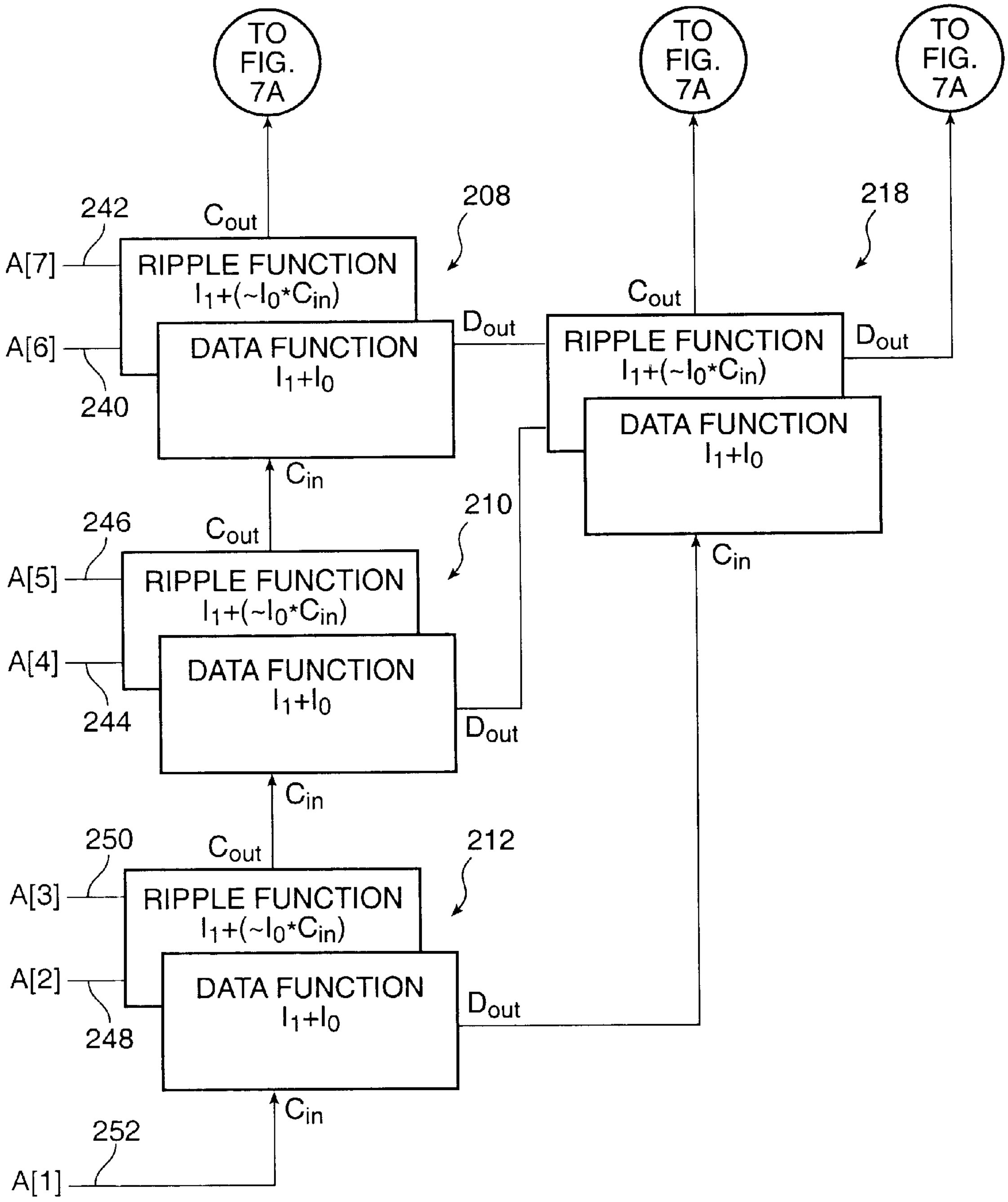

Examples of 3-2, 7-3, and 15-4 priority encoders generalized using ($2^n$-n−1) instances of ripple data function unit 116 are shown in FIGS. 5–7 below. Additional types of N to n priority encoders are not explicitly disclosed to avoid over-complicating the disclosure with cumulative information but are readily apparent from the examples below without undue invention by those of ordinary skill in the art.

A 3-2 priority encoder 132 may be generalized according to the following Boolean equations:

$$E[0]=A[3]+(\sim A[2]*A[1])$$

$$E[1]=A[3]+A[2].$$

As shown in FIG. 5, a 3-2 priority encoder 140 may be implemented using ripple-data function unit 116 by treating first data input 118, second data input 120, and carry-in input 122 as inputs A[3], A[2], and A[1], respectively. The outputs E[0] and E[1] of the 3-2 priority encoder are generated at carry-out output 124 and data-out output 126, respectively.

Using the same approach, a 7-3 priority encoder is generalized according to the following equations:

$$E[0]=A[7]+\sim A[6]*A[5]+\sim A[6]*\sim A[4]*A[3]+\sim A[6]*\sim A[4]*\sim A[2]*A[1]$$

$$E[1]=(A[7]+A[6])+\sim(A[5]+A[4])*(A[3]+A[2])$$

$$E[2]=A[7]+A[6]+A[5]+A[4].$$

As shown in FIG. 6, a 7-3 priority encoder 142 having inputs A[7], A[6], A[5], A[4], A[3], A[2], and A[1] and outputs E[0], E[1], and E[2] is implemented using five instances of ripple-data function unit 116, which are enumerated as instances 144, 146, 148, and 150. Inputs A[7] and A[6] are provided through first data input 152 and second data input 154 of instance 144. Similarly, inputs A[5], A[4], A[3], A[2], and A[1] are provided through first input data 156 and second input data 158 of instance 146 and first input data 160, second input data 162, and Cin input 164 of instance 148, respectively. Outputs E[0], E[1], and E[2] are provided through Cout output 166 of instance 144 and Cout output 168 and Dout output 170 of instance 150, respectively. Instance 150 is shown having first data input 172 and second data input 174 coupled to Dout output 176 of instance 144 and Dout output 178 of instance 146, respectively. Instance 150 is also shown with Cin input 180 coupled to Dout output 182 of instance 148.

In another example, a 15-4 priority encoder is generalized according to the following equations:

$$E[0]=A[7]+\sim A[6]*A[5]+\sim A[6]*\sim A[4]*A[3]+\sim A[6]*\sim A[4]*\sim A[2]*A[1]$$

$$E[1]=A[15]+A[14]+\sim(A[13\}+A[12])*(A[11]+A[10]+(\sim(A[9]+A[8])*(A[7]+A[6]+\sim(A[5]+A[4])*(A[3]+A[2])))$$

$$E[2]=A[15]+\sim A[14]+A13+A[12]+(A[11]+A[10]+A[9]+A[8]*(\sim A[7]+A[6]+\sim A[5]+A[4]))$$

$$E[3]=A[15]+A[14]+A[13]+A[12]+A[11]+A[10]+A[9]+A[8]$$

As shown in FIG. 7, a 15-4 priority encoder 201 may also be characterized by using multiple instances of ripple-data function unit 116. As described by the equation ($2^n$-n−1) discussed above, 11 instances of ripple-data function unit 116 are required to implement 15-4 priority encoder 201. The 11 instances are enumerated in FIG. 7 as instances 200, 202, 204, 206, 208, 210, 212, 214, 216, 218, and 220. A 15-4 priority encoder has inputs A[15] through A[1] inputs, inclusive. Inputs A[15] and A[14] are provided using first data input 224 and second data input 226 of instance 200. Inputs A[13] and A[12] are provided using first data input 228 and second data input 230 of instance 202. Inputs A[11] and A[10] are provided using first data input 232 and second data input 234 of instance 204. Inputs A[9] and A[8] are provided using first data input 236 and second data input 238 of instance 206. Inputs A[7] and A[6] are provided using first data input 240 and second data input 242 of instance 208. Inputs A[5] and A[4] are provided using first data input 244 and second data input 246 of instance 210. Inputs A[3], A[2] and A[1] are provided using first data input 248, second data input 250 and carry-in input 252 of instance 212.

In addition, a 15-4 priority encoder has outputs E[0] through E[3], inclusive. Output E[0] is provided using Cout output 254 of instance 200. Output E[1] is provided using Cout output 256 of instance 214. Output E[2] and E[3] are provided using Cout output 258 and Dout output 260, respectively of instance 220.

Using the generalization provided by ripple-data function unit 116 discussed above, many types of priority encoders may be generalized into a form which lends to a straight forward translation into elements readily available in an FPGA or an equivalent target technology. In accordance with a presently preferred embodiment of the present invention, ripple-data function unit 116 is implemented using a ripple chain logic element commonly found in FPGAs. Further disclosure as to the implementation of ripple-data function unit 116 using a ripple chain logic element is disclosed below. As recognized by those of ordinary skill in the art, ripple chain logic elements that are physically coupled to each other comprise a ripple chain. The ripple chain computes arithmetic carry functions according to the configuration of each ripple chain logic element used in the ripple chain. Ripple chains are sometimes referred to as carry chains.

The present invention is not intended to be limited to the above N to n priority encoders shown in FIGS. 5–7. Other types of N to n priority encoders may be implemented but are not explicitly disclosed herein to avoid over-complicating the disclosure with cumulative information. Moreover, the additional types of N to n priority encoders will be readily apparent from the disclosure without undue invention by one of ordinary skill in the art.

FIG. 8 illustrates a pseudo-code listing 270 representing a method for implementing an N to n priority encoder using $2^n$-n−1 instances of ripple-data function unit 116. The method may be used with or incorporated in a synthesis tool so that the synthesis tool is capable of creating a gate level netlist of the N to n priority encoder. Synthesis tools are known in the art.

The method arranges the required number of instances of ripple-data function unit 116 in a column format having n columns labeled 0 to n−1, with each column i producing E[i] and. The use of a column format is not intended to limit the method of implementing the N to n priority encoder in any way but is used to facilitate disclosure. Pseudo-code listing 270 implements instances of ripple-data function unit 116 by instantiating and coupling a first column of instances to produce output E[0], as shown in section 272. Next, additional instances are instantiated in column(s) after the first column, as shown in section 274. Last, output E[n-1] is provided, as shown in section 276.

Figure 9:
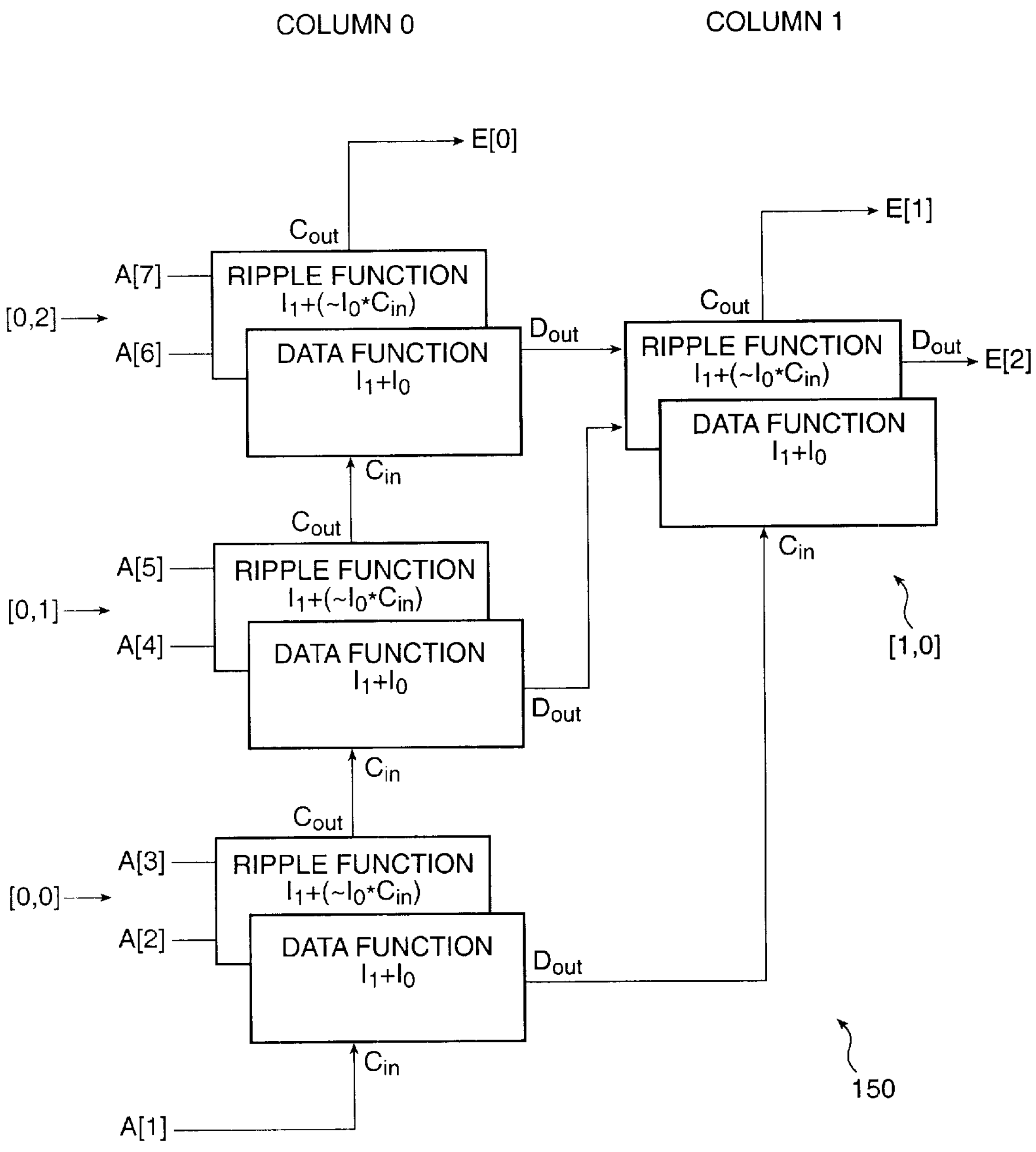
FIG. 9 is a block diagram of 7-3 priority encoder illustrated in FIG. 6 which is annotated with reference elements corresponding to the instances and column numbers described in the pseudo-code listing illustrated in FIG. 8 in accordance with a presently preferred embodiment of the present invention.

Pseudo-code listing 270 is best described by using FIG. 9 to illustrate how the instances are arranged in an N to n priority encoder, where N=$2^n$−1, according to the process described by pseudo-code listing 270. FIG. 9 is a block diagram of 7-3 priority encoder 150 illustrated in FIG. 6 that is annotated with reference elements corresponding to the instances and column numbers described in pseudo-code listing 270 when it is used to produce 7-3 priority encoder 150.

At section 272, instances [0,0], [0,1], and [0,2] are instantiated and are coupled in the manner shown in FIG. 9.

At section 274, the pseudo-code listing of "for (j [1 . . . $2^{n-1-k}-2$]" does not apply because n is equal to three. Instead, only instance [1,0] is instantiated in the pseudo-code loop defined by "for (k [1 . . . n-2])".

At section 276, the data output of instance [1,0] is coupled to E[2]. Thus, by using the method described by pseudo-code 270 in FIG. 8, an N to n priority encoder may be implemented using instance(s) of ripple-data function unit 116. This method also lends itself to the implementation of an N to n priority encoder using ripple chain elements commonly available in programmable logic arrays, as discussed below.

Figure 10:
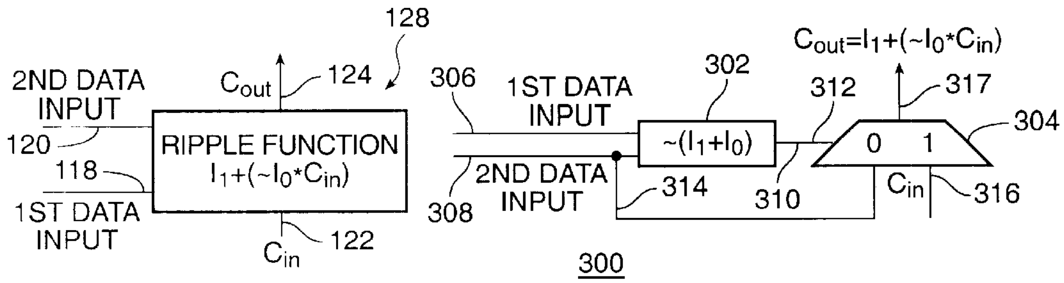
FIG. 10 is a block diagram illustrating a ripple function for use in implementing an N to n priority encoder in accordance with a presently preferred embodiment of the present invention.

FIG. 10 is a block diagram illustrating ripple function 128 (originally shown in FIG. 4) that is implemented using a ripple chain logic element 300, such as that commonly found in the Virtex family of FPGA devices, available from Xilinx, Corporation, of San Jose, Calif. A Virtex FPGA device typically includes a four input look-up table that has an output coupled to the select line of a two-input multiplexer. However, in the embodiment shown in FIG. 10, only two inputs of a look-up table 302 are required to implement ripple function 128. Look-up table 302 includes a look-up table first input 306 and a look-up table second input 308, which represent first data input 118 and second data input 120, respectively, of ripple function 128. Look-up table is configured to perform a logic OR operation using first data input 118 and second data input 120 and to invert the result of the logic OR operation. Look-up table output 310 is coupled to selector input 312 of multiplexer 304, enabling the result of the OR operation to function as a select signal for multiplexer 304. Besides selector input 312, multiplexer 304 also includes a multiplexer first input 314, a multiplexer second input 316, and a multiplexer output 317. Multiplexer first input 314 is coupled to look-up table second input 308. Multiplexer second input 316 and multiplexer output 317 represent Cin input 122 and Cout output, respectively, of ripple function 128.

Figure 11A:
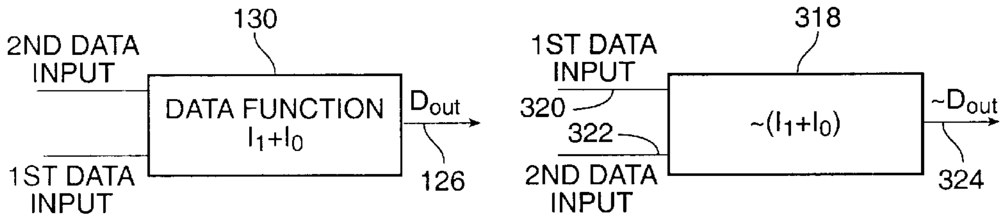
FIG. 11 is a block diagram illustrating a data function for use in implementing an N to n priority encoder constructed in accordance with a presently preferred embodiment of the present invention.
Figure 11B:
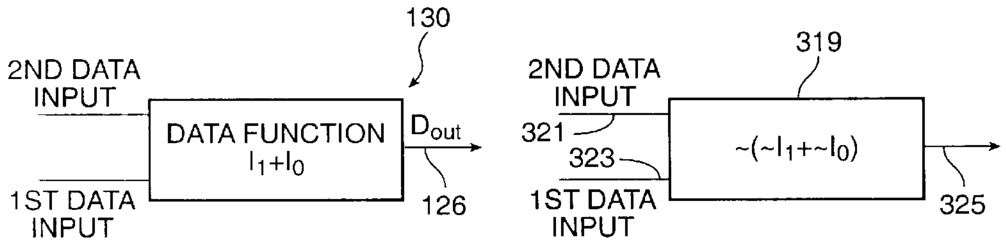

Similarly, data function 130, which is defined within ripple-data function unit 116, may also be implemented using a ripple chain logic element from the same Virtex family of FPGA devices, as shown in FIGS. 11A and 11B. Data function 130 is implemented in one of two ways depending on the type of priority encoder required. In FIG. 11A, data function 130 may be implemented using a look-up table 318 that inverts the result of a logical OR operation on the signals received from a look-up table first input 320 and a look-up table second input 322. This results in look-up table output 324 providing Dout output 126 in inverted form.

Providing an inverted form of Dout output 126 by configuring look-up table 318 in the manner shown in FIG. 11A provides a cost and efficiency advantage because the same ripple chain logic element used to implement a ripple function may be used to implement a data function when constructing a priority encoder using at least one ripple chain logic element. Specifically, look-up table output 310 in ripple chain logic element 300 is equivalent to look-up table output 324.

Referring now to FIG. 11B, data function 130 may also be implemented according to a second approach. A look-up table 319 is configured to perform an inversion on the logical OR operation on the inversion of the signals received from a look-up table first input 321 and a look-up table second input 323. This results in look-up table output 325 representing Dout output 126. This second implementation of data function 130 also provides a cost and efficiency advantage if a ripple chain logic element is driven from the inverted Dout output of a previous column. One example of such a ripple chain logic element configuration is shown in FIG. 13, below.

Figure 12:
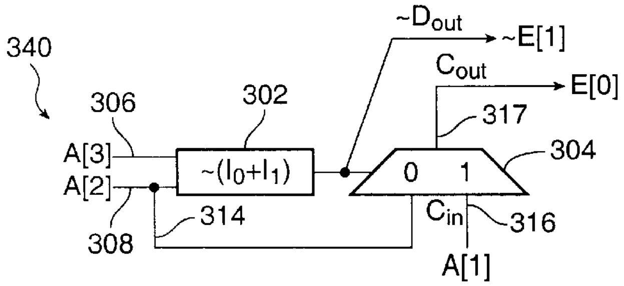
FIG. 12 is a block diagram illustrating a 3-2 priority encoder constructed using ripple chain logic elements in accordance with a presently preferred embodiment of the present invention.

FIG. 12 is a block diagram illustrating a 3-2 priority encoder 340 having inputs A[3], A[2], and A[1], output E[0], and inverted output E[1]. Inputs A[2], A[3], and A[1] are implemented using look-up table first input 306, look-up table second input 308, and multiplexer second input 316, respectively, of ripple chain 300 (see FIG. 10). Output E[0] and inverted output E[1] are represented by Cout output 17 of multiplexer 304 and inverted look-up table output 324 of look-up table 302, respectively.

Figure 13:
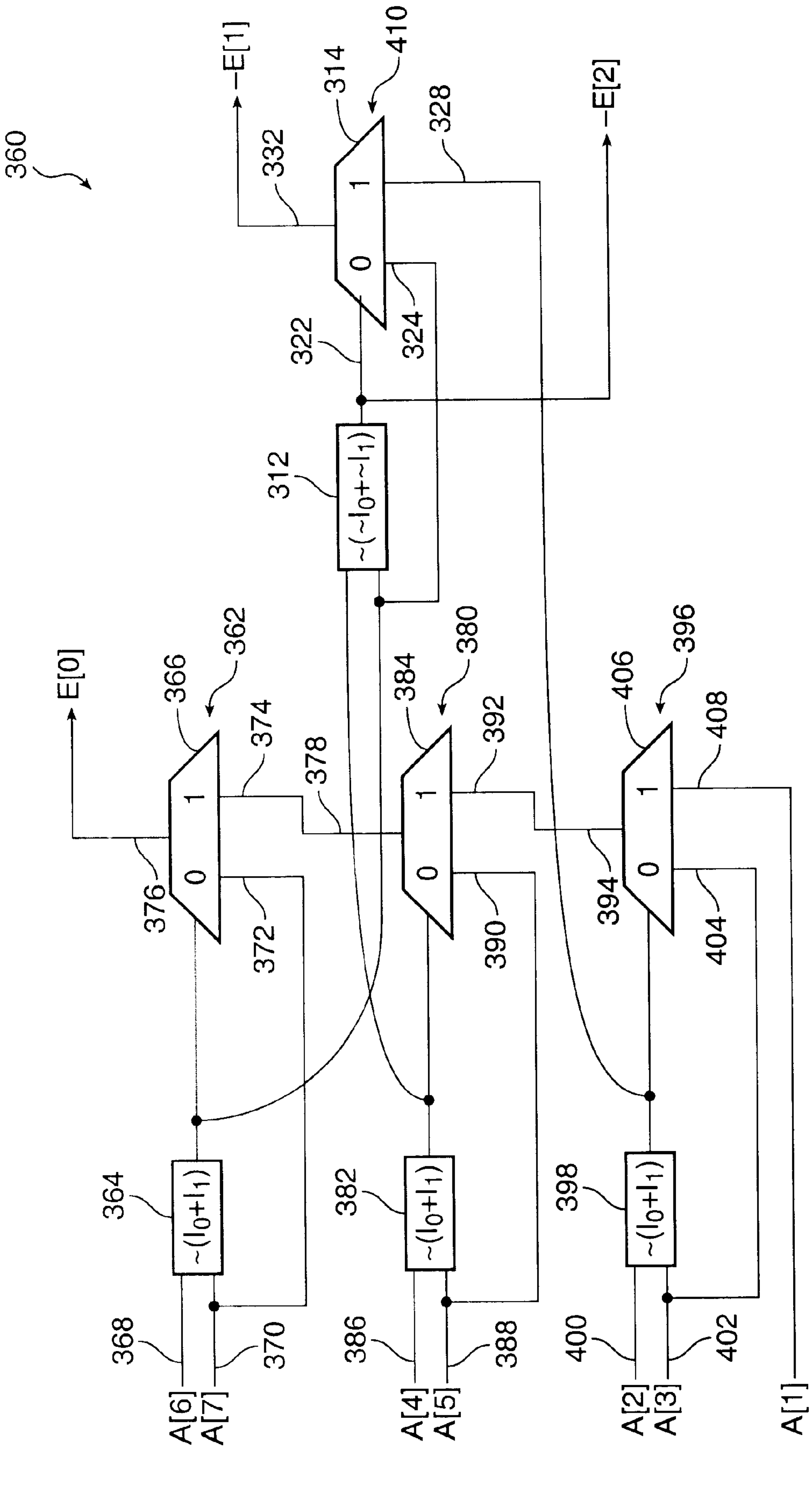
FIG. 13 is a block diagram illustrating a 7-3 priority encoder constructed using ripple chain logic elements in accordance with a presently preferred embodiment of the present invention.
Figure 14:
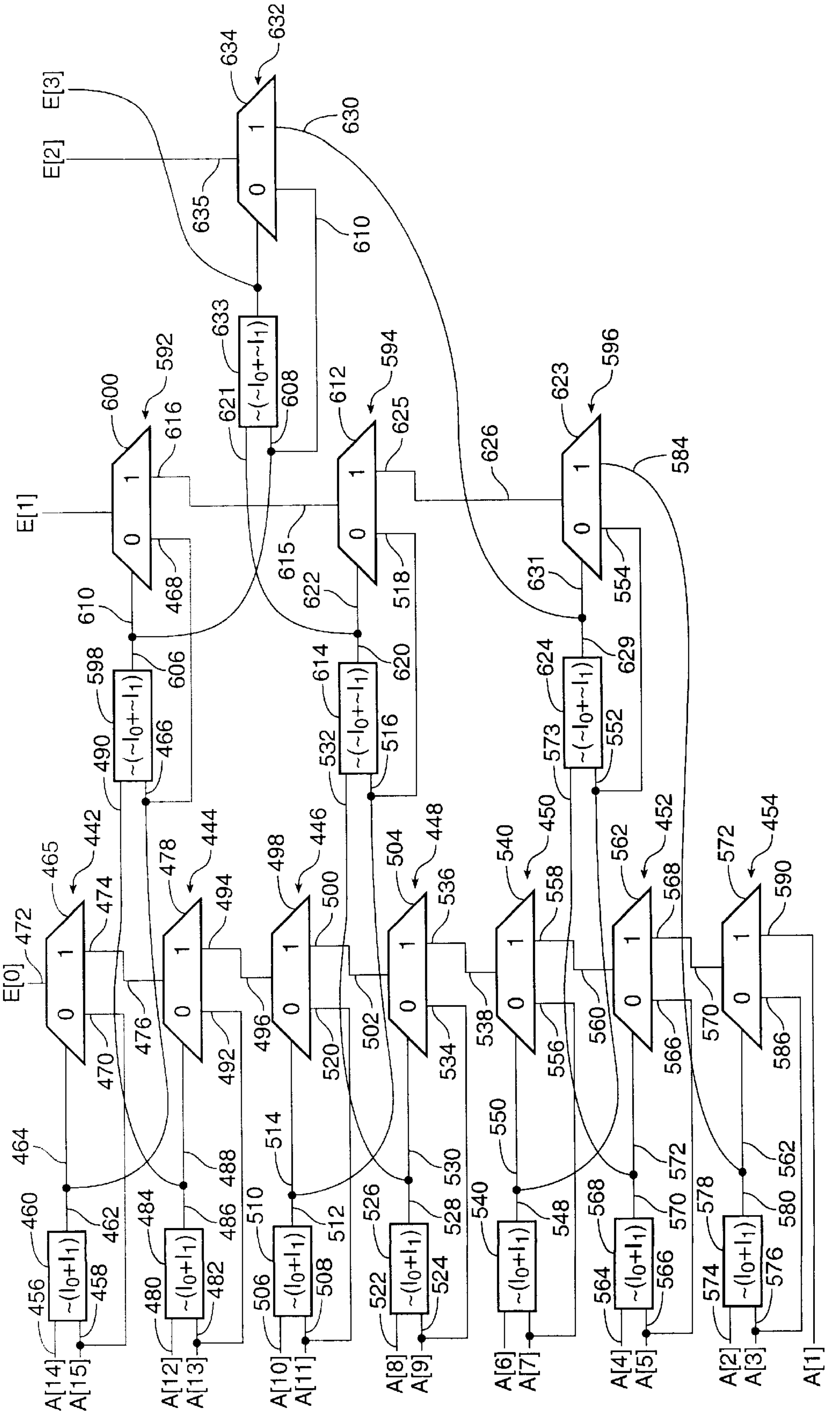
FIG. 14 is a block diagram illustrating a 15-4 priority encoder constructed using ripple chain logic elements in accordance with a presently preferred embodiment of the present invention.

Similarly, as shown in FIGS. 13 and 14, a 7-3 priority encoder 360 and a 15-4 priority encoder 440, respectively, may also be implemented using ripple chain logic elements. However, because a single ripple chain logic element is used to implement a ripple-data function, the look-up tables in each ripple chain logic element are configured according to the configurations shown in FIGS. 11A and 11B. This causes some of the output signals E[n] to have an inverted output, except E[0].

For example, the 7-3 priority encoder 360 is shown in FIG. 13 with inputs A[7] through A[1], inclusive, and with outputs E[0], inverted E[1], and inverted E[2]. The 15-4 priority encoder 440 is shown in FIG. 13 with inputs A[15] through A[1], inclusive, and with outputs E[0], inverted E[1], inverted E[2] and inverted E[3]. Thus, outputs E[1] and E[2] of priority encoder 360 and outputs E[1] through E[3] of priority encoder 440 are implemented as inverted outputs due to the use of ripple chain logic elements from the Virtex family of FPGAs available from Xilinx Corporation of San Jose, Calif. The use of Virtex ripple chain logic elements is not intended in any way to be limiting.

Referring again to FIG. 13, output E[0] is implemented using multiple instances of ripple chain logic element 300, which are coupled in the manner shown. Ripple chain logic elements 362 includes look-up table 364 and multiplexer 366. Look-up table 364 includes look-up table first input 368 and look-up table second input 370, which provide inputs A[6] and A[7], respectively, of 7-3 priority encoder 360. Multiplexer 336 includes multiplexer first input 372, multiplexer second input 374, and multiplexer output 376. Multiplexer first input 372 is coupled to look-up table second input 370, and multiplexer output 376 provides output E[0].

Multiplexer second input 374 is coupled to multiplexer output 378 corresponding to ripple chain logic element that includes look-up table 382 and multiplexer 384. Input A[4] and input A[5] are implemented using look-up table first input 386 and look-up table second input 388, respectively. Multiplexer first input 390 is coupled to look-up table second input 388 and multiplexer second input 392 is coupled to multiplexer output 394 of ripple chain logic element 396.

Look-up table 398 includes look-up table first input 400 and look-up table second input 402, which represent inputs A[2] and A[3] of 7-3 priority encoder 360. Look-up table second input 402 is coupled to multiplexer first input 404 of multiplexer 406. Multiplexer second input 408 represents input A[1].

Outputs E[1] and E[2] of 7-3 priority encoder 360 are provided using ripple chain logic element 410 but as shown, generate an inverted logic signal. Those of ordinary skill in the art will readily recognize that outputs E[1] and E[2] may easily be converted to provide a non-inverted output signal using an inverter, or any equivalent circuit, if needed. Ripple chain logic element 410 includes look-up table 412 and multiplexer 414. Look-up table 412 includes a look-up table first input 416 and a look-up table second input 418 which receive the output signals generated by look-up tables 382 and 364, respectively. Look-up table output 320 provides output E[2] of 7-3 priority encoder 360 and provides a selector signal to selector input 322 of multiplexer 314.

Multiplexer first input 324 is coupled to look-up table output 326, and multiplexer second input 328 is coupled to look-up table output 330. Multiplexer output 332 provides output E[1].

As can be seen in FIG. 13, look-up tables 364, 382, and 398 are used in ripple chain elements 366, 380, and 394, respectively. Each look-up table performs a logic OR operation on the input signals asserted on their respective inputs and inverts the result, as described in FIG. 11A. This permits look-up tables 364, 382, and 398 to be used with their multiplexers to implement a ripple function necessary to generate E[0], and to be used for implementing their respectively data functions. This obtains cost and efficiency advantages previously described above. However, such an approach requires ripple chain logic element 410, which is used to implement the remaining data and ripple functions, to have a look-up table configured according to FIG. 11B. Specifically, look-up table 312 inverts each input signal before performing a logical OR operation, and inverts the result of the OR operation.

Figure 15:
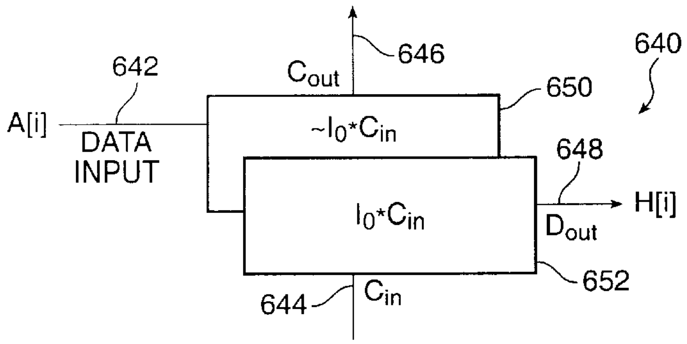
FIG. 15 is a block diagram illustrating a ripple-data function unit configured for implementing an N-bit priority to 1-HOT recoder in accordance with a presently preferred embodiment of the present invention.

In FIG. 14, 15-4 output E[0] of 15-4 priority encoder 440 is implemented using ripple chain logic elements 442, 444, 446, 448, 450, 452 and 454 that are configured to have the ripple and data function properties disclosed in FIGS. 10 through 11A. Inputs A[14] and A[15] are implemented using look-up table first input 456 and look-up table second input 458 of look-up table 460. Look-up table output 462 is coupled to selector input 464 of multiplexer 465, look-up table second input 466, and multiplexer first input 468. Multiplexer first input 470 is coupled to input A[15]. Output E[0] is provided through multiplexer output 472.

Multiplexer second input 474 is coupled to multiplexer output 476 of multiplexer 476. Inputs A[12] and A[13] are implemented using look-up table first input 480 and look-up table second input 482 of look-up table 484. Look-up table output 486 is coupled to selector input 488 of multiplexer 478 and to look-up table first input 490. Multiplexer first input 492 is coupled to input A[13]. Multiplexer second input 494 is coupled to multiplexer output 496 of multiplexer 498.

Multiplexer second input 500 is coupled to multiplexer output 502 of multiplexer 504. Inputs A[11] and A[10] are implemented using look-up table first input 506 and look-up table second input 508 of look-up table 510. Look-up table output 512 is coupled to selector input 514 of multiplexer 498, to look-up table second input 516, and to multiplexer first input 518. Multiplexer first input 520 is coupled to input A[11].

Inputs A[8] and A[9] are implemented using look-up table first input 502 and look-up table second input 524 of look-up table 526. Look-up table output 528 is coupled to selector input 530 of multiplexer 504 and to look-up table first input 532. Multiplexer first input 534 is coupled to input A[9]. Multiplexer second input 536 is coupled to multiplexer output 538 of multiplexer 540.

Inputs A[6] and A[7] are implemented using look-up table first input 542 and look-up table second input 544 of look-up table 546. Look-up table output 548 is coupled to selector input 550 of multiplexer 540, to look-up table second input 552, and to multiplexer first input 554. Multiplexer first input 556 is coupled to input A[7]. Multiplexer second input 558 is coupled to multiplexer output 560 of multiplexer 562.

Inputs A[4] and A[5] are implemented using look-up table first input 564 and look-up table second input 566 of look-up table 568. Look-up table output 570 is coupled to selector input 572 of multiplexer 562 and to look-up table first input 573. Multiplexer first input 566 is coupled to input A[5]. Multiplexer second input 568 is coupled to multiplexer output 570 of multiplexer 572.

Inputs A[2] and A[3] are implemented using look-up table first input 574 and look-up table second input 576 of look-up table 578. Look-up table output 580 is coupled to selector input 582 of multiplexer 572 and to multiplexer second input 584. Multiplexer first input 586 is coupled to input A[3]. Multiplexer second input 590 represents input A[1].

As can be seen in FIG. 14, look-up tables 460, 484, 510, 526, 540, 568, and 578 are configured to invert the resulting logic OR operation between each of their inputs, as described in FIG. 11A. This permits the look-up tables to be used with their multiplexers to implement a ripple function for generating E[0] and to be used for implementing their respectively data functions. This creates cost and efficiency advantages previously described above. However, such an approach requires subsequent ripple chain logic elements 592, 594, 596, and 632, which are used to implement the remaining data and ripple functions, to have a look-up table configured according to FIG. 11B. Specifically, each of the look-up tables are configured to invert the incoming input signals before performing a logical OR operation, and to invert the result of the OR operation.

Ripple chain logic elements 592, 594, and 596 are used to implement a ripple function necessary for generating an inverted signal at multiplexer output 598, which represents output E[1]. Ripple chain logic element 592 includes look-up table 598 and multiplexer 600. Look-up table first input 490 and look-up table second input 466 are coupled to look-up table outputs 486 and 462. Look-up table output 606 is coupled to look-up table second input 608 and to selector input 610.

Multiplexer 612 and look-up table 614 comprise ripple chain logic element 594. Multiplexer 612 includes a multiplexer output 615 coupled to multiplexer second input 616. Look-up table 614 includes look-up table first input 532 and look-up table second input 516 that are coupled to look-up table outputs 528 and 512, respectively. Look-up table output 620 is coupled to look-up table first input 621 of multiplexer 634 and to selector input 622 of multiplexer 612.

Multiplexer 623 and look-up table 624 comprise ripple chain logic element 596. Multiplexer 623 includes a multiplexer output 626 coupled to multiplexer second input 625. Look-up table 624 includes look-up table first input 573 and look-up table second input 552 that are coupled to the look-up table outputs 570 and 548, respectively. Look-up table output 629 is coupled to multiplexer second input 630 of multiplexer 634 and to selector input 631 of multiplexer 623.

Ripple chain logic element 632 provides outputs ~E[2] and ~E[3] and includes a look-up table 633 and multiplexer 634. When configured in the manner shown in FIG. 14, look-up table 633 generates an inverted E[2] output signal, and multiplexer 634 has a multiplexer output 635 that generates an inverted E[3] output signal.

FIG. 15 illustrates a ripple-data function unit 640 configured for implementing an N-bit priority to 1-HOT recoder in accordance with a presently preferred embodiment of the present invention. Ripple-data function unit 640 includes data input 642, carry-in input 644, carry-out output 646, and data output 648. In addition, ripple-data function unit 640 includes a ripple function 650 and a data function 652. Ripple function 650 is defined by the following Boolean expression: carry-out output =~ data input * carry-in input. Data function 130 is defined by the following Boolean expression: data output=data input * carry-in input.

An N-bit priority to 1-HOT recoder having inputs A[N:1] and outputs H[N:O], where H[N]=A[N], may be expressed according to the following equations:

$$\underset{0<n<N}{H[n]} = A[n]\prod_{i=n+1}^{N} \sim A[i]$$

$$H[0] = \prod_{i=n+1}^{N} \sim A[i]$$

In accordance with a presently preferred embodiment of the present invention, an N-bit priority to 1-HOT recoder is generalized using at least two ripple-data function units, where the number of ripple-data function units used is equal to N. Thus, an N-bit priority to 1-HOT recoder may be constructed using N instances of ripple-data function unit 640 having the ripple and data functions disclosed above. An example of a 4-bit priority to 1-HOT recoder generalized using four instances of ripple data function unit 640 is discussed below. The exact implementation of additional types of N priority 1-HOT recoders are not explicitly disclosed to avoid over-complicating the disclosure with cumulative information but are readily apparent from the example below without undue invention by those of ordinary skill in the art.

A 4-bit priority to 1-HOT recoder 654 is generalized according to the following Boolean equations:

$$H[4]=\sim A[7]*\sim A[6]*\sim A[5]*A[4]$$

$$H[3]=\sim A[7]*\sim A[6]*\sim A[5]*\sim A[4]*A[3]$$

$$H[2]=\infty A[7]*\sim A[6]*\sim A[5]*\sim A[4]*\sim A[3]*A[2]$$

$$H[1]=A[7]*\sim A[6]*\sim A[5]*\sim A[4]*\sim A[3]*A[2]*A[1]$$

$$H[0]=\sim A[7]*\sim A[6]*\sim A[5]*\sim A[4]*\sim A[3]*\sim A[2]*\sim A[1]$$

Figure 16:
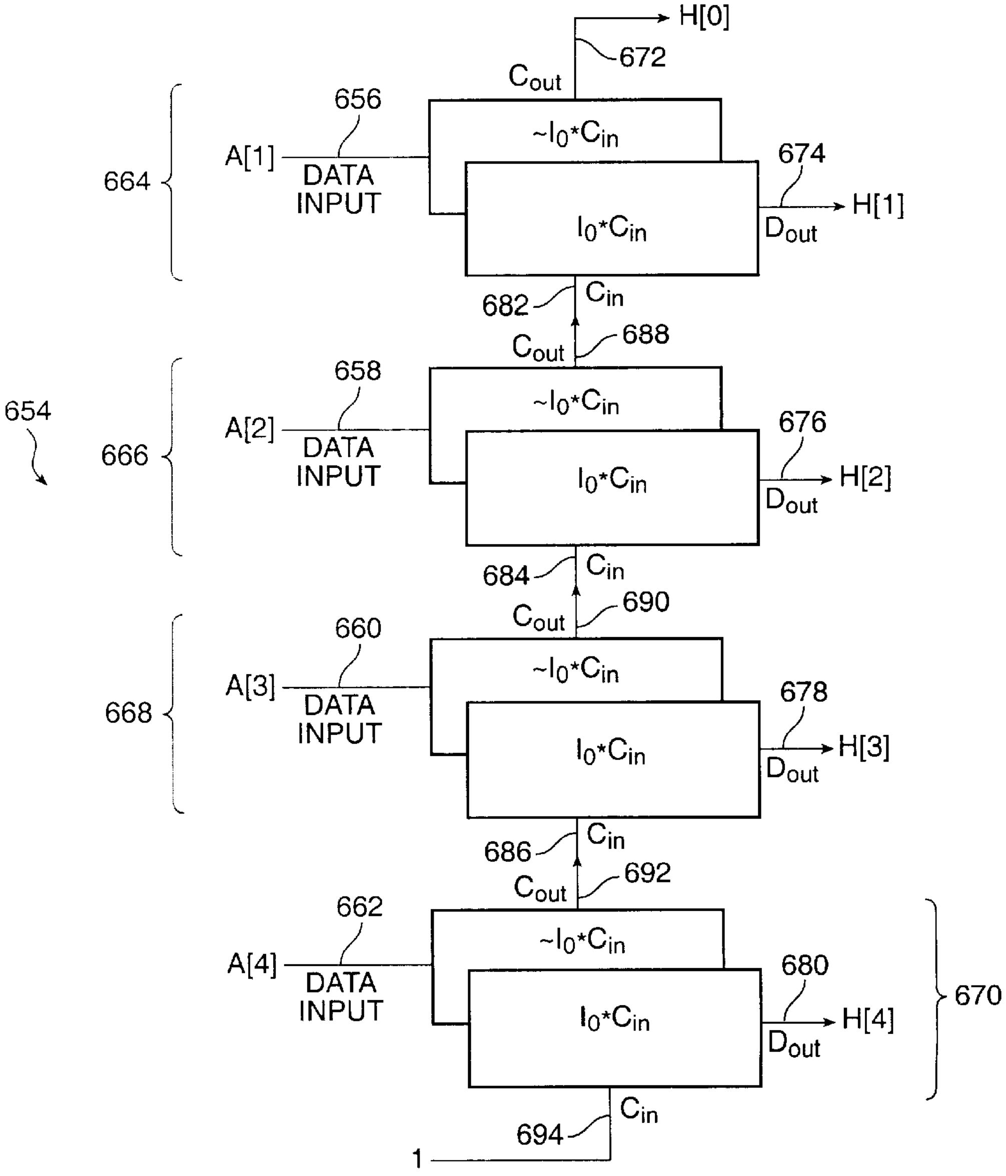
FIG. 16 is a block diagram illustrating a 4-bit priority to 1-HOT recoder that is implemented using four instances of a ripple-data function unit in accordance with a presently preferred embodiment of the present invention.

As shown in FIG. 16, a 4-bit priority to 1-HOT recoder 654, which includes inputs A[1], A[2], A[3], and A[4] and outputs H[4], H[3], H[2], H[1] and H[0], is implemented using four instances of ripple-data function unit 640. Inputs A[1] through A[4] are provided data inputs 656, 658, 660, and 662 of instances 664, 666, 668, and 670, respectively. Outputs H[0] through H[4], inclusive are provided by carry-out output 672 and data outputs 674, 676, 678, 680 of instances 664 through 670, respectively. Carry-in inputs 682, 684, are 686 are coupled to carry-out outputs 688, 690, and 692, respectively. The carry-in input that is associated with the instance having a data output representing the most significant output bit is coupled to a logic 1 signal. Since H[4] is the most significant output bit in this example, carry-in input 694 of instance 670 is coupled to a logic 1 signal.

Figure 17:
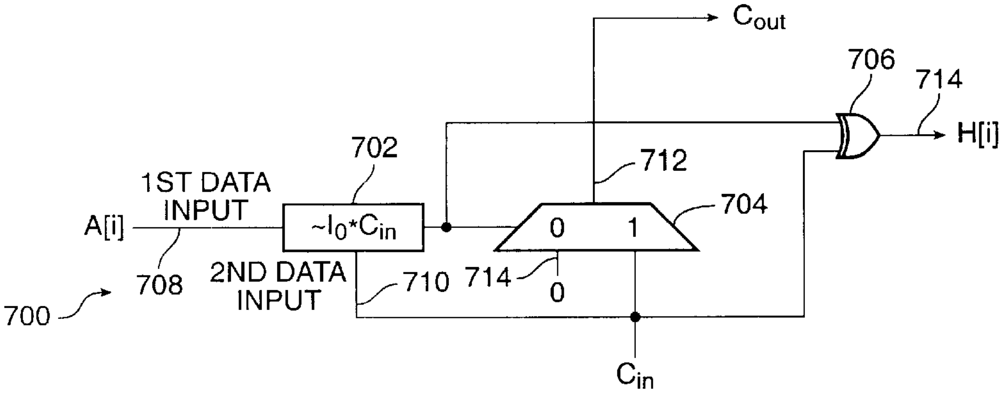
FIG. 17 is a block diagram illustrating ripple data function unit implemented using ripple chain elements in accordance with a presently preferred embodiment of the present invention.

FIG. 17 is a block diagram illustrating ripple data function unit 640 (see FIG. 15) implemented using ripple chain elements, such as those commonly found in the Virtex family of ASIC devices, available from Xilinx, Corporation, of San Jose, Calif. Input A[i], carry-in input 644, carry-out output 646, and output H[i] 648 are represented using a ripple chain 700 having a look-up table 702, a two-bit multiplexer 704, and a two-input XOR gate 706. A look-up table first input 708 and a look-up table second input 710 are used to represent an input A[i] and carry-in input 644, respectively.

Carry-out output 646 is represented using a multiplexer output 712 because multiplexer output 712 in ripple chain 700 is equal to:

(~first data input* second data input) * second data input+(~(~(first data input* second data input)* 0).

This Boolean expression reduces to:

~first data input * second data input, which is equivalent to the Boolean function defined for ripple function 650 above.

Data output 648 is represented using XOR output 714 because XOR output 714 in ripple chain 700 is equal to:

(~first data input* second data input) ⊕ second data input.

This equation may be transformed into the following Boolean equation:

(~first data input* second data input) *~second data input.+

(~(~first data input *second data input)*second data input).

The above equation, in turn, may be expressed as:

(~first data input* second data input*~second data input)+

Figure 18:
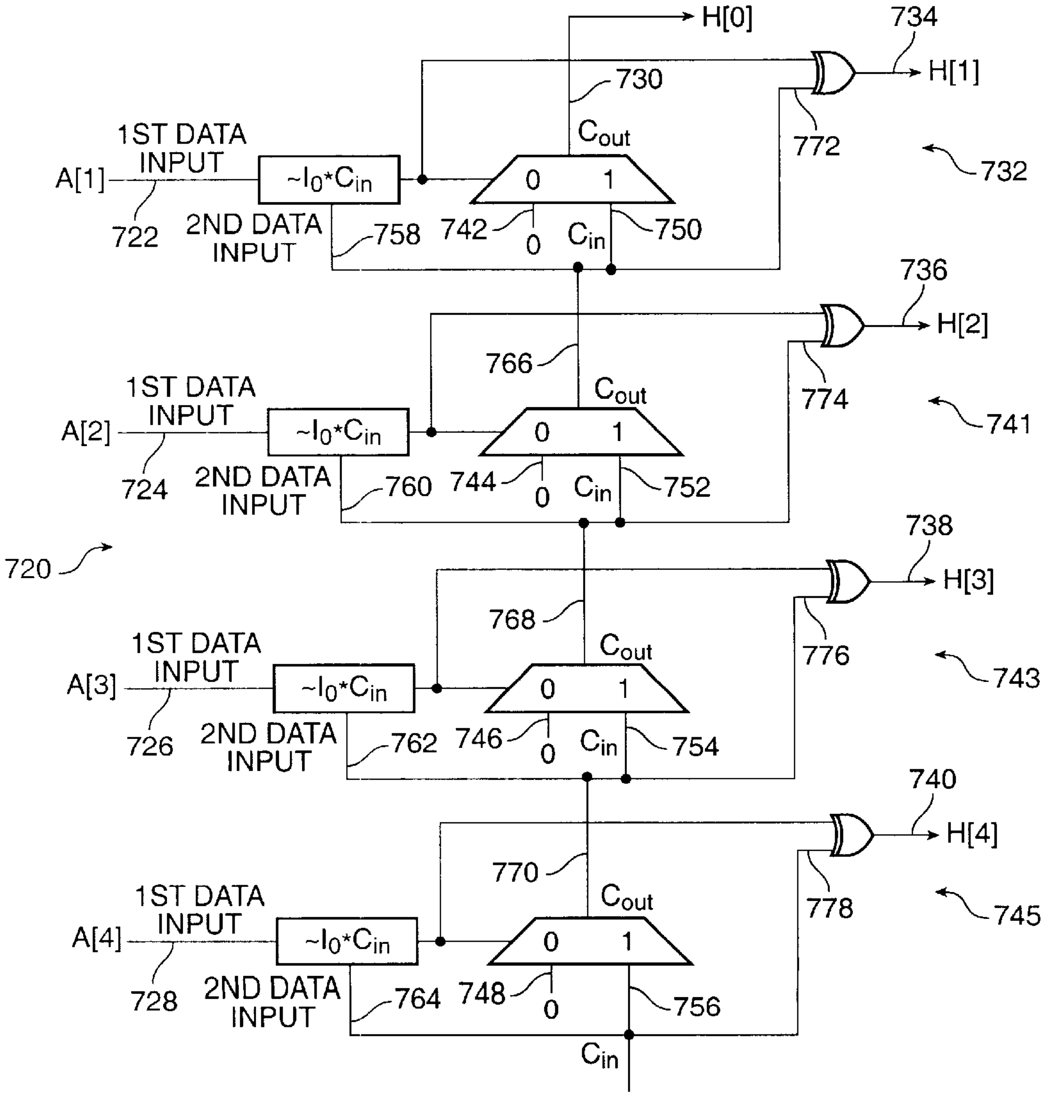
FIG. 18 is a block diagram illustrating a 4-bit priority to 1-HOT recoder implemented using four instances of a ripple chain in accordance with a presently preferred embodiment of the present invention.

((~~first data input +~ second data input)* second data input), which is equal to:

0+(first data input +~ second data input)* second data input, and which eventually transforms into the Boolean equation of:

first data input * second data input,

FIG. 18 is a block diagram illustrating a 4-bit priority to 1-HOT recoder 720 implemented using N instances of ripple chain 700. Four-bit priority to 1-HOT recoder 720 is shown with inputs A[1], A[2], A[3], and A[4], and outputs H[0], H[1], H[2], H[3], and H[4]. Inputs A[1], A[2], A[3], and A[4] are implemented using look-up table first data input 722, look-up table first data input 724, look-up table first data input 726, and look-up table first data input 728. Output H[0] is provided using multiplexer output 730 of instance 732. Outputs H[1] through [4], inclusive, are provided using XOR outputs 734, 736, 738, and 740. The XOR outputs correspond to ripple chain instances 741, 743, and 745. Multiplexer first inputs 742, 744, 746, and 748 are asserted with a logic 0. Multiplexer second inputs 750, 752, 754, and 756 are coupled to: look-up table second inputs 758, 760, 762, and 764, respectively; to multiplexer outputs 766, 768, and 770, respectively; and to XOR first inputs 772, 774, 776, and 778. The multiplexer second input corresponding to the carry chain instance providing the most significant output H[N] is asserted with a logic high signal. In this example, multiplexer second input 756 is associated with the carry chain instance providing the most significant output H[4], and thus, is shown asserted with a logic high signal.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

I claim:

1. A ripple-data function unit for use in a priority circuit, comprising:

a Cin input;

a Cout output;

a Dout output;

at least one data input; and wherein said Cout output is a first Boolean function representing a ripple characteristic of the priority circuit, and said Dout is a second Boolean function representing an arithmetic characteristic of the priority encoder.

2. The ripple-data function unit of claim 1, wherein said at least one data input includes a first data input and a second data input.

3. The ripple-data function unit of claim 2, wherein:

said first Boolean function is a function of said Cin input, said first data input, and said second data input; and said second Boolean function is a function of said first data input and said second data input.

4. The ripple-data function unit of claim 1, wherein said Cout output is equal to the sum of said first data input and the inverse of the product of said second data input and said Cin input.

5. The ripple-data function unit of claim 1, wherein said Dout output is equal to the sum of said first data input and said second data input.

6. The ripple-data function unit of claim 1, wherein:

said Cout output is equal to the sum of said first data input and the inverse of the product of said second data input and said Cin input; and said Dout output is equal to the sum of said first data input and said second data input.

7. The ripple-data function unit of claim 1, further comprising a first look-up table having a first look-up table input coupled to said first data input, a second look-up table input coupled to said second data input, and a first look-up table output coupled to said Dout output.

8. The ripple-data function unit of claim 7, further comprising a first multiplexer having a first propagate-control input coupled to said first look-up table output, a first input coupled to said first data input, and a second input coupled to said Cin input.

9. The ripple-data function unit of claim 7, where said first look-up table output provides a function equal to the product of said first data input and said second data input.

10. The ripple-data function unit of claim 7, where said first look-up table output provides a function equal to an inverse of the sum of said first data input and said second data input.

11. The ripple-data function unit of claim 1, wherein said Cout output is equal to the sum of an inverse of said at least one input and said Cin input.

12. The ripple-data function unit of claim 1, wherein said Dout output is equal to the sum of said at least one input and said Cin input.

13. A ripple data function unit for use in a priority encoder, comprising:

a Cin input;

a Cout output;

a Dout output;

a first data input and a second data input, and wherein said Cin input is propagated at said Cout output if said first data input and said second data input both receive logic high signals and said Dout output is equal to the sum of said first data input and said second data input.

14. A ripple-data function unit for use in a priority encoder, comprising:

a Cin input;

a Cout output;

a Dout output;

a first data input and a second data input;

a look-up table having a first look-up table input coupled to said first data input, a second look-up table input coupled to said second data input, and a look-up table output coupled to said Dout output; and wherein said Cin input is propagated at said Cout output if said first data input and said second data input both receive logic high signals and said Dout output is equal to the sum of said first data input and said second data input.

15. The ripple-data function unit of claim 14, further comprising: a first multiplexer having a first propagate-control input coupled to said look-up table output, a first input coupled to said first data input, and a second input coupled to said Cin input.

16. The ripple-data function unit of claim 14, wherein said look-up table output provides a function equal to the product of said first data input and said second data input.

17. The ripple-data function unit of claim 14, wherein said look-up table output provides a function equal to an inverse of the sum of said first data input and said second data input.

18. A 3-2 priority encoder having a first input, a second input, a third input, a first inverted output, and a first non-inverted output, comprising:

a ripple-data function-0 block having a generate input coupled to said third input, a block input coupled to said second input, a Cin input coupled to said first input, a Dout output coupled to said first inverted output, a Cout output coupled to said first non-inverted output; and wherein said Cout output is a first Boolean function comprising said Cin input, said generate input, and said block input, and said Dout output is a second Boolean function comprising said generate input and said block input.

19. The digital circuit of claim 18, wherein said Cout output is equal to the sum of said generate input and the inverse of the product of said block input and said Cin input.

20. The digital circuit of claim 18, wherein said Dout output is equal to the sum of said generate input and said block input.

21. The digital circuit of claim 18, further comprising a carry chain element having a first input coupled to said generate input, a second input coupled to said block input, and an output coupled to said Dout output.

22. The digital circuit of claim 21, wherein said output is equal to an inverse of the sum of said generate input and said block input.

23. The digital circuit of claim 18, further comprising a look-up table having a first look-up table input coupled to said generate input, a second look-up table input coupled to said block input, and a look-up table output coupled to said Dout output.

24. The digital circuit of claim 23, further comprising: a multiplexer having a first propagate-control input coupled to said look-up table output, a first selector input coupled to said generate input, and a second selector input coupled to said Cin input.

25. The digital circuit of claim 23, wherein said look-up table output is equal to an inverse of the sum of said generate input and said block input.

26. A 7-3 priority encoder having a first input, a second input, a third input, a fourth input, a fifth input, a six input, a seventh input, a first inverted output, a second inverted output, and a non-inverted output, comprising:

a first ripple-data function-0 unit having a first generate input coupled to said seventh input, a first block input coupled to said sixth input, a first Cin input, and a first Dout output, and a first Cout output coupled to said non-inverted output;

a second ripple-data function-0 unit having a second generate input coupled to said fifth input, a second block input coupled to said fourth input, a second Cin input, and a second Dout output, and a second Cout output coupled to said first Cin input;

a third ripple-data function-0 unit having a third generate input coupled to said third input, a third block input coupled to said second input, a third Cin input coupled to said first input, and a third Dout output, and a third Cout output coupled to said second Cin input; and a ripple-data function unit having a fourth generate input coupled to said first Dout output, a fourth block input coupled to said second Dout output, a fourth Cin input coupled to said third Dout output, and a fourth Dout output coupled to said first inverted output, and a fourth Cout output coupled to said second inverted output.

27. The 7-3 priority encoder of claim 26, wherein said first Cout output provides an output signal according to a first Boolean function involving said Cin input, said first generate input and said first block input, and said first Dout output provides an output signal according to a second Boolean function involving said first generate input and said first block input.

28. The 7-3 priority encoder of claim 26, wherein said second Cout output provides an output signal according to a first Boolean function involving said second Cin input, said second generate input and said second block input, and said second Dout output provides an output signal according to a second Boolean function involving said second generate input and said second block input.

29. The 7-3 priority encoder of claim 26, wherein said third Cout output provides an output signal according to a first Boolean function involving said third Cin input, said third generate input and said third block input, and said third Dout output provides an output signal according to a second Boolean function involving said third generate input and said third block input.

30. The 7-3 priority encoder of claim 26, wherein said fourth Cout output provides an output signal according to a first Boolean function involving said fourth Cin input, said fourth generate input and said fourth block input, and said fourth Dout output provides an output signal according to a second Boolean function involving said fourth generate input and said fourth block input.

31. A fifteen-to-four (15-4) priority encoder having a first input, second input, third input, fourth input, fifth input, sixth input, seventh input, eight input, ninth input, tenth input, $11^{th}$ input, $12^{th}$ input, $13^{th}$ input, $14^{th}$ input, and a $15^{th}$ input, and a first output, a first inverted output, second inverted output, and third inverted output, said priority encoder comprising:

a first ripple-data unit-0 having a first generate input coupled to said $15^{th}$ input, a first block input coupled to said $14^{th}$ input, a first carry input, a first data output, and a first carry output connected to said first output;

a second ripple-data unit-0 having a second generate input coupled to said $13^{th}$ input, a second block input coupled to said $12^{th}$ input, a second carry input, a second data output, and a second carry output coupled to said first carry input;

a third ripple-data unit-0 having a third generate input coupled to said $11^{th}$ input, a third block input coupled to said $10^{th}$ input, a third carry input, a third data output, and a third carry output coupled to said second carry input;

a fourth ripple-data unit-0 having a first generate input coupled to said ninth input, a fourth block input coupled to said eighth input, a fourth carry input, a fourth data output, and a fourth carry output coupled to said third carry input;

a fifth ripple-data unit-0 having a first generate input coupled to said seventh input, a fifth block input coupled to said sixth input, a fifth carry input, a fifth data output, and a fifth carry output connected to said fourth carry input; a sixth ripple-data unit-0 having a sixth generate input coupled to said fifth input, a sixth block input coupled to said fourth input, a sixth carry input, a sixth data output, and a sixth carry output coupled to said fifth carry input;

a seventh ripple-data unit-0 having a seventh generate input coupled to said third input, a seventh block input coupled to said second input, a seventh carry input, coupled to said first input, a seventh data output, and a seventh carry output coupled to said sixth carry input;

a eighth ripple-data unit-0 having a eighth generate input coupled to said first data output, a eighth block input coupled to said second data output, eighth carry input, a eighth data output, and a eighth carry output coupled to said first inverted output; a ninth ripple-data unit-0 having a ninth generate input coupled to said third data output, a ninth block input coupled to said fourth data output, ninth carry input, a ninth data output, and a ninth carry output coupled to said eighth carry input;

a tenth ripple-data unit-0 having a tenth generate input coupled to said fifth data output, a tenth block input coupled to said sixth data output, tenth carry input coupled to said seventh data output, a tenth data output, and a tenth carry output coupled to said ninth carry input; and a $11^{th}$ ripple-data unit-0 having a $11^{th}$ generate input coupled to said eighth data output, a $11^{th}$ block input coupled to said ninth data output, $11^{th}$ carry input coupled to said tenth data output, $11^{th}$ carry input coupled to said third inverted output, and a $11^{th}$ carry output coupled to said second inverted output.

32. A method for synthesizing a ($2^n$−1 to n) priority encoder circuit design into a gate-level netlist, the method comprising:

generalizing the priority encoder circuit design into at least one ripple-data function unit having a ripple function, a data function, first data input, a second data input, a carry-in input, a carry-out output, and a data-out output; and wherein said ripple function is a Boolean function representing a ripple characteristic of the priority encoder, and said data function is a Boolean function representing an arithmethic characteristic of the priority encoder.

33. The method of claim 32, when said ripple function is:

a Boolean of expression of carry-out output=first data input+(second data input* carry-in input).

34. The method of claim 32, when said data function is:

a Boolean expression of data-out output=first data input+second data input.

35. The method of claim 32, further including:

implementing said at least one ripple function using a carry chain element; and implementing said at least one data function using a first look-up table.

36. The method of claim 35, further including defining said carry chain element using a second look-up table and a multiplexer.

37. The method of claim 36, further including coupling an output of said second look-up table to a selector input of said multiplexer.

38. An N-bit priority to 1-HOT recoder having N inputs and N+1 outputs, the recoder comprising:

N ripple-data function units having N data inputs coupled to the N inputs, respectively, N Cin inputs having a logic 1 value, N Dout outputs coupled to the N+1 outputs, respectively, and N Cout outputs coupled to said (N−1) Cin inputs, respectively; and wherein each of N Cout outputs is equal to a product of said N Cin inputs and an inverse of N data inputs, respectively; and said N Dout outputs is equal to a product of said N Cin inputs and N data inputs, respectively.

39. A method for synthesizing a ($2^n$−1 to n) priority encoder circuit design into a gate-level netlist, the method comprising:

generalizing the priority encoder circuit design into at least one ripple-data function at having a ripple function, a data function, first data input, a second data input, a carry-in input, a carry-out output, and a data-out output;

wherein said ripple function is: a Boolean expression of carry-out output=first data input+(second data input*carry-in input), wherein said data function is: a Boolean expression of data-out output=first data input+second-data input.

40. A ripple-data function unit for use in a priority to 1-HOT recoder, comprising:

a Cin input;

a Cout output;

a Dout output;

a data input; and wherein said Cout is defined by first Boolean function characterizing a ripple characteristic of the priority to 1-HOT recoder and said Dout is defined by a second Boolean function characterizing arithmetic characteristic of the priority to 1-HOT recoder.

41. The ripple-data function unit of claim 40, wherein said first Boolean function is equal to: ~data input *Cin input.

42. The ripple-data function unit of claim 40, wherein said second Boolean function is equal to: data input * Cin input.

43. A priority to 1-HOT recoder, comprising:

a first ripple-data function unit having a first data input, a first Cin input, a first Dout output, and a first Cout output; and wherein said first Cout output is equal to a product of first Cin input and an inverse of said first data input, and said first Dout output is equal to a product of said first Cin input and said first data input; and wherein said first data input defines a first input of the recoder, said first Cout output defines a first output of the recoder, and said first Dout defines a second output of the recoder.

44. The priority to 1-HOT recoder of claim 43, wherein said second Cin input has a logic 1 value.

45. The priority to 1-HOT recoder of claim 43, wherein said first Cin input has a logic 1 value.

46. The priority to 1-HOT recoder of claim 43, further comprising:

a second ripple-data function unit having a second data input, a second Cin input, a second Dout output, and a second Cout output; and wherein said second Cout output is equal to a product of second Cin input and an inverse of said second data input, and said second Dout output is equal to a product of said second Cin input and said second data input; and wherein said second data input defines a second input of the recoder, said second Cout output is coupled to said first Cin input, and said second Dout define a third output of the recoder.

47. A ripple-data function unit for use in a priority to 1-HOT recoder, comprising:

a Cin input;

a Cout output;

a Dout output;

a data input;

a look-up table having a look-up table first input coupled to said data input, a look-up table second input coupled to said Cin input, and a look-up table output;

a multiplexer having a selector input coupled to said look-up table output, a multiplexer first input set to a logic 1 value, a multiplexer second input coupled to said Cin input, and a multiplexer output coupled to said Cout output;

an XOR having an XOR first input coupled to said look-up table output and an XOR second input coupled to said Cin input; and wherein said look-up table output is a Boolean function defined by a product of said Cin input and an inverse of said look-up table first input.

48. The ripple-data function unit of claim 47, wherein said look-up table and said multiplexer are part of a carry chain logic element.

49. A ripple-data function unit for use in a priority to 1-HOT recoder, comprising:

a Cin input, a Cout output;

a Dout output;

a data input;

means for generating a logic signal at Cout according to a ripple characteristic of the priority to 1-HOT recoder; and means for generating a logic signal at Dout according to an arithmetic characteristic of the priority to 1-HOT recoder.

50. The ripple-data function unit of claim 49, wherein said means for generating a logic signal at Cout includes a look-up table having a look-up table first input coupled to said data input, a look-up table second input coupled to said Cin input, and a look-up table output coupled to a selector input of a multiplexer, said multiplexer having a multiplexer first input, a multiplexer second input coupled to said Cin input, and a multiplexer output coupled to said Dout output.

51. The ripple-data function unit of claim 50, wherein said means for generating a logic signal at Dout includes an XOR gate having an XOR output coupled to said Dout, an XOR first input coupled to said look-up table output and an XOR second input coupled to said Cin input.

* * * * *

UNITED STATES PATENT AND TRADEMARK OFFICE
CERTIFICATE OF CORRECTION

PATENT NO. : 6,215,325 B1
DATED : April 10, 2001
INVENTOR(S) : Jay Roger Southard It is certified that error appears in the above-identified patent and that said Letters Patent is hereby corrected as shown below:

<u>Column 1,</u>
Line 59, replace "18-n" with -- 18-m --.
Lines 60, and 61,replace "22-n" with -- 22-m --.
Line 62, replace "18-n" with -- 18-m --

<u>Column 5,</u>
Line 53, replace "[13}" with -- [13] --.

<u>Column 6,</u>
Line 54, after "E[i]" insert -- . --.
Line 55, delete "and".

<u>Column 11,</u>
Line 44, replace "H[2]= ∞ A[7]*" with -- H[2]=~A[7]* --.

<u>Column 12,</u>
Line 14, after "second data input," insert a paragraph.
Line 23, delete ".".
Line 29, after "input)," insert a paragraph.
Line 31, after "input," insert a paragraph.
Line 33, replace "," with -- . --.

<u>Column 17,</u>
Line 25, replace "at" with -- unit --.
Line 33, after "second" delete "-".

Signed and Sealed this

Twenty-sixth Day of February, 2002

*Attest:*

JAMES E. ROGAN

*Attesting Officer* *Director of the United States Patent and Trademark Office*